(12) United States Patent
Hessler et al.

(10) Patent No.: US 10,477,563 B2
(45) Date of Patent: Nov. 12, 2019

(54) SCHEDULING FOR MULTIPLE RECEPTION POINT RADIO NETWORKS

(71) Applicant: TELEFONAKTIEBOLAGET LM ERICSSON (PUBL), Stockholm (SE)

(72) Inventors: Martin Hessler, Linköping (SE); Henrik Sahlin, Mölnlycke (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 144 days.

(21) Appl. No.: 15/127,575

(22) PCT Filed: Apr. 10, 2014

(86) PCT No.: PCT/EP2014/057264
§ 371 (c)(1),
(2) Date: Sep. 20, 2016

(87) PCT Pub. No.: WO2015/154810
PCT Pub. Date: Oct. 15, 2015

(65) Prior Publication Data
US 2018/0110058 A1    Apr. 19, 2018

(51) Int. Cl.
*H04W 4/00*  (2018.01)
*H04W 72/12*  (2009.01)
(Continued)

(52) U.S. Cl.
CPC ......... *H04W 72/121* (2013.01); *H04L 1/0027* (2013.01); *H04W 56/003* (2013.01); *H04W 56/004* (2013.01); *H04W 56/0005* (2013.01); *H04W 72/1268* (2013.01)

(58) Field of Classification Search
CPC ........... H04W 72/121; H04W 72/1268; H04W 56/005; H04L 1/0027; H04L 12/26
See application file for complete search history.

(56) References Cited

U.S. PATENT DOCUMENTS

| 2003/0076874 A1* | 4/2003 | Li | H04B 1/7103 375/145 |
| 2011/0085460 A1* | 4/2011 | Zhang | H04B 7/024 370/252 |

(Continued)

FOREIGN PATENT DOCUMENTS

WO    2011047077 A2    4/2011

OTHER PUBLICATIONS

European Communication dated Jan. 24, 2018, issued in European Patent Application No. 14716814.0, 8 pages.
(Continued)

*Primary Examiner* — Abdelnabi O Musa
(74) *Attorney, Agent, or Firm* — Rothwell, Figg, Ernst & Manbeck, P.C.

(57) ABSTRACT

A method, performed in a network control entity, for scheduling communication of node signals from at least one network node to one or more reception points. The method comprising the steps of estimating (S2) the arrival time of each reference signal detected at a reception point, and determining (S5) node signal compatibility in each of the one or more reception points based on estimated reference signal arrival time, wherein node signals are deemed compatible at a given reception point if the node signals can be received in the same transmission time interval, TTI, at the given reception point, as well as scheduling (S6) communication, comprising scheduling of reception times at the one or more reception points, of at least one node signal based on determined node signal compatibility to construct a communication schedule where only compatible node signals are scheduled in the same TTI in each reception point.

14 Claims, 8 Drawing Sheets

(51) Int. Cl.
*H04W 56/00* (2009.01)
*H04L 1/00* (2006.01)

(56) References Cited

U.S. PATENT DOCUMENTS

| | | | | |
|---|---|---|---|---|
| 2013/0058315 | A1* | 3/2013 | Feuersanger | H04W 52/281 370/336 |
| 2014/0226640 | A1* | 8/2014 | Zhu | H04W 56/0045 370/336 |
| 2014/0295881 | A1* | 10/2014 | Werner | H04W 4/023 455/456.1 |
| 2015/0094103 | A1* | 4/2015 | Wang | H04W 4/023 455/456.6 |
| 2015/0195674 | A1* | 7/2015 | Opshaug | H04W 4/02 455/456.6 |

OTHER PUBLICATIONS

International Search Report and Written Opinion for International Patent Application No. PCT/EP2014/057264, dated Dec. 11, 2014, 8 pages.
Texas Instruments, Timing Advance in support of UL CoMP, 3GPP TSG RAN WG1 #67, R1-113789, San Francisco, USA, Nov. 14-18, 2011, 3 pages.
MediaTek Inc., Specification Impact for the Support of UL CoMP, 3GPP TSG-RAN WG1 #66bis, R1-113052, Zhuhai, China, Oct. 10-14, 2011, 2 pages.
Huawei et al., Discussion on Timing Advance issue in CoMP, 3GPP TSG RAN WG1 meeting #55bis, R1-090130, Ljubljana, Slovenia, Jan. 12-16, 2009, 9 pages.
Texas Instruments, On the Need for Timing Advance Specification Changes for UL CoMP, 3GPP TSG RAN WG1 #69, R1-122737, Prague, Czech Republic, May 21-25, 2012, 5 pages.

\* cited by examiner

SCHEDULING FOR MULTIPLE RECEPTION POINT RADIO NETWORKS

CROSS REFERENCE TO RELATED APPLICATION(S)

This application is a 35 U.S.C. § 371 National Phase Entry Application from PCT/EP2014/057264, filed Apr. 10, 2014, designating the United States, the disclosure of which is incorporated by reference.

TECHNICAL FIELD

The present disclosure relates to scheduling of communication in a radio network, and in particular to scheduling of communication in a radio network where a transmitted signal can be received jointly at more than one reception point.

BACKGROUND

A radio network is a network where network nodes transmit node signals which are received at one or more reception points in the radio network.

The network nodes, to exemplify, can be user equipments, UEs, which are transmitting node signals over the uplink in a 3GPP Long Term Evolution, LTE, network, in which case the reception points are connected to radio base stations, eNodeBs, of the radio access network. Thus, the node signals can be uplink signals in a radio access network.

The network nodes, to provide another example, can also be radio transceivers in a wireless local area network, WLAN, in which case the reception points are connected to access points of the WLAN. Thus, the node signals can be radio signals transmitted to a WLAN access point.

In both examples, a correct time alignment of node signals with respect to a reception time used for receiving the node signals is often crucial in order to attain reliable communication in the radio network. This time alignment of node signals can be calibrated either by properly adjusting the transmission time of node signals, or by adjusting, at the receiver side, the starting time for processing the one or more node signals. Irrespective of the method used, time alignment must often be re-calibrated continuously as network nodes move around in the radio network, since moving around generally changes the propagation delay of transmitted node signals with respect to a given reception point, and thus affects node signal time alignment.

In LTE radio access networks implementing orthogonal frequency division multiplexing, OFDM, as radio access technology, the time alignment between received OFDM symbols and the Fast Fourier Transform, FFT, time window used by an eNodeB in detecting said symbols, is important in order to be able to successfully decode the OFDM symbols. Also, a correct time alignment, with respect to said FFT time window, between two or more OFDM symbols received from different network nodes at a reception point, is important in order to maintain orthogonality between received node signals, i.e., in order to avoid the inter-carrier interference which may result if the time alignment is not sufficiently accurate.

Radio networks implementing OFDM as radio access technology in general, and LTE networks in particular, often implement two main mechanisms for achieving time alignment of uplink node signals and avoiding inter-carrier interference.

The first such mechanism is the use of cyclic prefixes which are added to the transmitted node signals in order to provide a measure of robustness against time alignment errors. The cyclic prefixes allow two or more OFDM symbols to be received as orthogonal node signals, i.e., not interfering significantly with each other, as long as the reception time window used for receiving the OFDM symbols starts during the cyclic prefix of all OFDM symbols. Hence, the cyclic prefixes serve to relax requirements on time alignment of node signals at a reception point, but they also introduce signaling overhead. Therefore, it is preferred to keep the cyclic prefix length as small as possible. In the single carrier, SC-, OFDM transmission format implemented for the uplink in LTE, the cyclic prefix is also used to account for any delay-spread of the physical radio channel due to, e.g., multi-path propagation.

The other time alignment mechanism is the timing advance, TA, commands which are transmitted in order to adjust transmission times of node signals to align different node signals at a given reception point with a reception window used for detecting node signals. The timing advance commands contain a negative offset in time between downlink and uplink subframes, and are used to account for propagation delay from a network node to a reception point. In this way all UEs transmitting in the uplink to a given reception point are time aligned to be received within the cyclic prefixes, thus assuring orthogonality between node signals.

Thus, in LTE, timing advance is done by the serving eNodeB with the aim of having a correct time alignment in the uplink for the serving eNodeB. However, if multiple reception points are used for uplink reception of a node signal, the timing advance mechanism does not necessarily time align node signals at all reception points. In fact, in some scenarios, differences in propagation delay or delay spread between a network node transmitting a node signal and the multiple reception points arranged to receive the node signal can be such as to make time alignment of the node signal in all reception points difficult or even impossible by use of timing advance commands and cyclic prefixes alone.

Consequently, there is a need for improved time alignment mechanisms for use in scenarios where multiple physically separated reception points are used for reception of one or more transmitted node signals.

Furthermore, in many scenarios where multi-point reception of node signals could potentially increase network performance, the inter-carrier interference level in the reception points can be too severe at times in order for the received node signal to be of any use. It is therefore not necessarily so that all reception points should be used to receive all node signals, and an informed selection of reception points therefore needs to be made.

Thus, there is also a need for a mechanism to select reception points to use in radio networks employing multiple reception points to receive a transmitted node signal.

SUMMARY

An object of the present disclosure is to provide a method, a computer program, and a network control entity which seeks to mitigate, alleviate, or eliminate one or more of the above-identified deficiencies in the art and disadvantages singly or in any combination and to provide improved network control.

This object is obtained by a method, performed in a network control entity, for scheduling communication of node signals from at least one network node to one or more reception points. The method comprises the steps of estimating, based on pre-scheduled transmission of reference signals from network nodes, the arrival time of each reference signal detected at a reception point, and determining compatibility between node signals received in the one or more reception points based on the estimated arrival times, wherein node signals are deemed compatible at a given reception point if the node signals can be received in one and the same transmission time interval, TTI, at the given reception point. The method also comprises the step of scheduling communication, comprising scheduling of reception times at the one or more reception points, of at least one node signal based on the determined node signal compatibility to construct a communication schedule where only compatible node signals are scheduled in the same TTI in each reception point.

Thus, improvements in network control of time alignment are provided, and in particular improvements in controlling the scheduling of node signals. By the steps of determining node signal compatibility and scheduling communication of at least one node signal based on this determined node signal compatibility there is provided a method for time alignment of node signals which overcomes the problem of having multiple reception points for receiving node signals since only network nodes which are physically possible to align sufficiently well in time are scheduled for transmission and/or reception at the same time.

Further, by the present teaching of scheduling reception times based on node signal compatibility, multi-point reception of node signals is facilitated in scenarios which would not have been plausible given a fixed reception time system.

Furthermore, since co-scheduled node signals can, by the determined communication schedule, be received in the same TTI, a single FFT window can be used for receiving the node signals, which is advantageous in that it reduces complexity of the receiver system.

According to an aspect, the method further comprises the step of pre-scheduling transmission of reference signals from each of the one or more network nodes, and the step of estimating arrival time also comprises estimating the arrival time of reference signals by correlating a received signal against the transmitted reference signals.

Thus, by the feature of pre-scheduling transmission of reference signals, estimating arrival time of node signals is facilitated, which is an advantage. Further, said pre-scheduling of reference signal transmission can be adapted to the current communication scenario, which is an advantage. For instance, reference signal transmission can be pre-scheduled to occur only when estimates of arrival times are needed, which reduces network signaling overhead.

According to an aspect, the method also comprises the step of determining a reception time window, based on determined reference signal arrival time, for reception of each node signal at each of the one or more reception points. Also, the step of determining node signal compatibility is further arranged to be based on the at least one determined reception time window.

The determining of a reception time window simplifies determining node signal compatibility since node signal compatibility can be determined in a straight forward way from comparing reception time windows in terms of time overlap. This is an advantage since the comparison of reception time windows in terms of time overlap can be implemented in an efficient manner, saving both processing resources and processing power.

There is also provided a computer program, comprising computer readable code which, when run on an apparatus, causes the apparatus to perform the method disclosed herein.

The object is also obtained by a network control entity configured for scheduling communication of node signals from at least one network node to one or more reception points. The network control entity comprises an estimating module configured to estimate the arrival time of reference signals detected at a reception point based on pre-scheduled transmission of reference signals from network nodes. The network control entity also comprises a node signal compatibility determining module arranged to determine node signal compatibility in each of the one or more reception points based on estimated reference signal arrival time, wherein node signals are deemed compatible at a given reception point if the node signals can be received in the same transmission time interval, TTI, at the given reception point. The network control entity further comprises a scheduling module configured to schedule communication, and in particular to schedule reception times, of at least one node signal based on determined node signal compatibility, and also to construct a communication schedule where only compatible node signals are scheduled in the same TTI in each reception point.

The computer program and the network control entity display advantages corresponding to the advantages already described in relation to the methods performed in the network control entity.

BRIEF DESCRIPTION OF THE DRAWINGS

Further objects, features, and advantages of the present disclosure will appear from the following detailed description, wherein some aspects of the disclosure will be described in more detail with reference to the accompanying drawings, in which.

DETAILED DESCRIPTION

Figure 1:
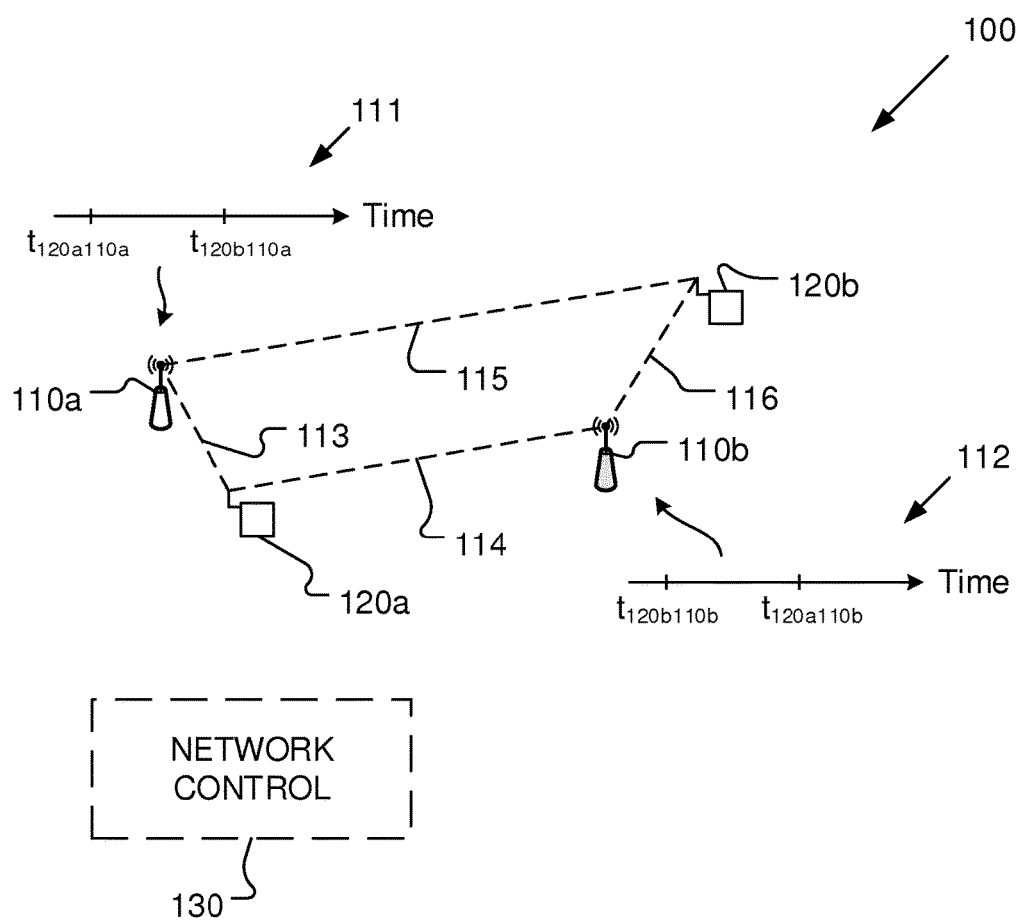
FIG. 1 is a block diagram illustrating embodiments of a network.

Aspects of the present disclosure will be described more fully hereinafter with reference to the accompanying drawings. The apparatus, computer program and methods disclosed herein can, however, be realized in many different forms and should not be construed as being limited to the aspects set forth herein. Like numbers in the drawings refer to like elements throughout, except for a prefix digit in the number which represents the drawing page in which the element is to be found.

The terminology used herein is for the purpose of describing particular aspects of the disclosure only, and is not intended to limit the invention. As used herein, the singular forms "a", "an" and "the" are intended to include the plural forms as well, unless the context clearly indicates otherwise.

FIG. 1 shows a block diagram illustrating a network 100 with network nodes 120a, 120b. The network nodes are arranged to communicate node signals via radio links 113, 114, 115, 116 to a first 110a and a second 110b reception point in the network 100. Due to differences in propagation delay, transmitted node signals arrive at different times at the different reception points 110a, 110b. This is illustrated by the two time lines 111, 112 which show relative arrival times $t_{120a110a}$ and $t_{120b110a}$ at the first reception point 110a, and relative arrival times $t_{120a110b}$ and $t_{120b110b}$ at the second reception point 110b, respectively. There is further shown a network control entity 130 arranged to control communication of node signals in the network 100, which control comprises scheduling of node signals communication.

The network control entity 130 is, according to one aspect, a scheduling unit comprised in a radio base station or eNodeB of the radio network 100. According to another aspect the network control entity 130 is a central network scheduling unit configured to determine a global communication schedule for at least part of the radio network 100.

Looking at the radio network 100 in FIG. 1, it is noted that timing advance commands alone can never perfectly time align node signals from the two network nodes 120a, 120b at both reception points 110a, 110b at the same time. If the transmission time of one network node is slightly postponed, the arrival time difference of the node signals will always shrink at one reception point and increase at the other.

Time alignment can further be made complicated if reception points have clock references which drift with respect to each other, in which case a timing mechanism for continuously adjusting reception timing is needed.

The present disclosure aims at solving at least some of the problems mentioned above associated with communication of one or more node signals from the one or more network nodes 120a, 120b to one or more physically separated reception points 110a, 110b in a network 100.

In particular, a solution is presented herein where estimates of node signal arrival time at the one or more physically separated reception points 110a, 110b are used to determine which network nodes 120a, 120b that are compatible in the sense that they can be scheduled jointly for reception in the same TTI at a given reception point 110a, 110b.

The proposed method searches for network nodes 120a, 120b which are located, relative to reception points 110a, 110b, such that arrival times of node signals at the reception points 110a, 110b coincide in time sufficiently well for node signals to be received within the same TTI. Such nodes, if found, are then scheduled jointly for reception at a given reception point in the network 100 by the network control entity 130.

Thus, it is understood that only network nodes which have similar propagation delays to a given reception point can be found compatible at that reception point.

Further, since there at times will be reception points where no suitable scheduling can be found for receiving a given node signal with sufficient signal quality, it is further proposed herein to determine which reception points out of a plurality of reception points, that are suitable for use in multi-point reception of uplink node signals based on the estimates of node signal arrival time.

Thus, in scenarios where differences in propagation delay or delay spread between one or more network nodes 120a, 120b and one or more reception points 110a, 110b are such as to make time alignment of the node signals in all reception points difficult or even impossible, reliable multiple reception point communication can still be achieved by only selecting a subset of reception points to use for receiving a given node signal.

It is noted that time alignment is an issue that also can be problematic if only a single antenna is used for receiving a given node signal. In LTE, this problem is especially evident when the impulse response of the radio propagation channel is longer than the cyclic prefix, CP, used in LTE uplink SC-OFDM. For a 64 quadrature amplitude modulated, QAM, signal the performance deficit due to that the impulse response is not captured by the cyclic prefix can be as large as 10 dB due to receiver imperfections. This is despite that the energy not captured by the cyclic prefix seems to be negligible, i.e., the delay-spread is not significantly larger than the cyclic prefix. This implies that if a UE is not sufficiently time-aligned to the eNodeBs general OFDM intervals, one should preferably establish time alignment with respect to this UE independently of other UEs. A problem then is that this implies a risk that the processing of this node signal needs to be done independently of the other node signals that are received at the same time.

WO 2009/124558 considers a similar problem related to transmission of radio signals in communication systems with multiple geographically separated reception points. The disclosure of WO 2009/124558 teaches a method wherein transmit timings for radio transmissions between user equipment and distributed antennas are established, whereupon radio transmissions are scheduled based on the established transmit timings. However, the solution provided in the disclosure of WO 2009/124558 can be further improved upon in that only scheduling of transmissions is disclosed by WO 2009/124558. Herein, scheduling of reception times at the one or more reception points is proposed. According to aspects, the scheduling of reception times is herein done jointly with the scheduling of transmission times or independently of the scheduling of transmission times.

Figure 2A:
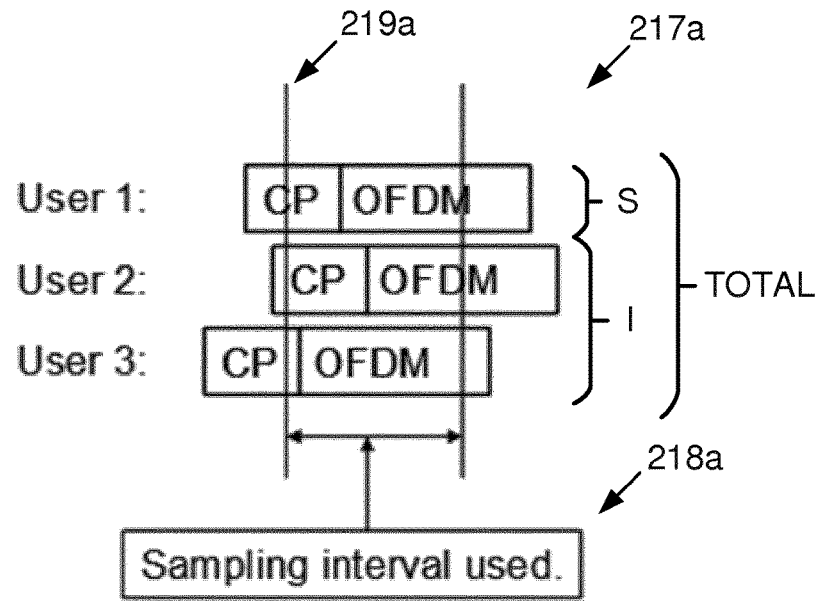
FIGS. 2a and 2b schematically illustrate reception timing and sampling intervals at a reception point.
Figure 2B:
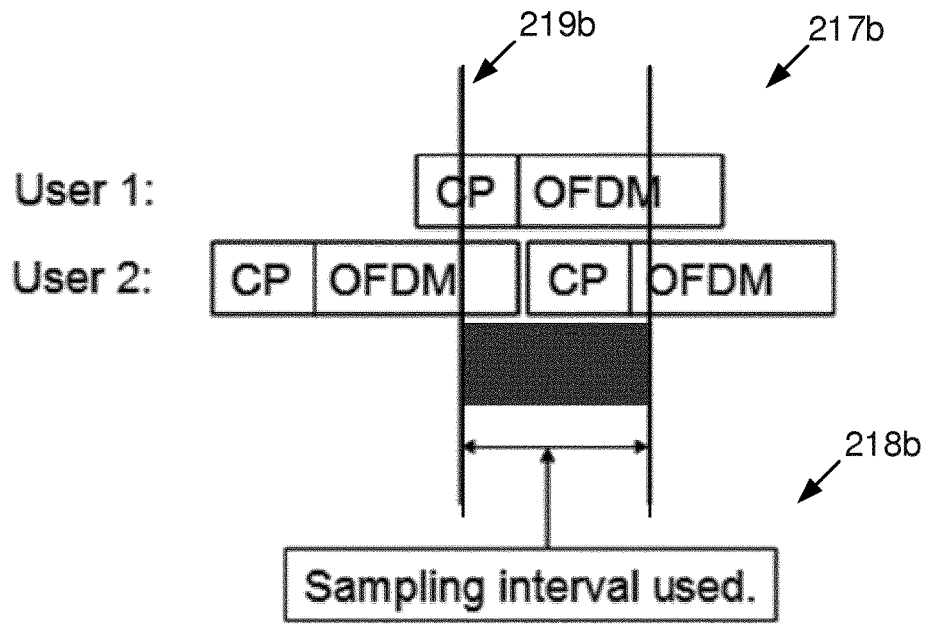

FIGS. 2a and 2b schematically illustrate reception timing at a reception point. In LTE uplink there are a number of reasons why you would like all users to be time aligned in a reception point, which situation is shown in FIG. 2a. We will list some of the reasons for this below.

In FIG. 2a, three node signals 217a are received at a reception point from three users, or network nodes. The node signals comprise OFDM symbols, and each OFDM symbol has a cyclic prefix, marked as CP in FIG. 2a. There is further shown a sampling interval 218a, which, according to aspects, is an FFT window used in detecting the node signals. Suppose the sampled node signal from user 1 is a signal S of interest, and the remaining node signals, marked in FIG. 2a as I, constitute potential interference to S. The total received signal is the sum of S and I, marked in FIG. 2a as TOTAL.

When the UEs are time aligned we pick our sampling interval so that we get the best possible reception, if the transmissions on different sub-carriers are captured within their cyclic prefix, they will be close to orthogonal. In FIG. 2a it is seen that the three node signals have been time aligned such that the sampling interval start 219a is contained within the cyclic prefixes. Consequently, orthogonality between node signals 217a is maintained and no significant inter-carrier interference to S is generated by the remaining node signals I.

However, in FIG. 2b correct time alignment of node signals 217b has not been achieved, since the sampling interval start 219b is outside of the cyclic prefix for the second node signal, i.e., the signal received from user 2. Due to the misalignment in time, the two node signals will not be orthogonal and consequently there will be inter-carrier interference.

When an uplink signal comprising a node signal is received at a reception point, there is a need to establish time alignment with the node signal at the reception point. If the transmission parameters, and especially a reference symbol sequence, of the user are known, this is in principle possible without having done any special timing advance transmissions to the network node, or UE. However, this implies that FFT time interval choice and processing must, potentially, be done per wireless node.

Also, for advanced receivers it is possible to perform good interference suppression if the used sampling intervals for different users are approximately the same. The reason for this is, disregarding imperfections, that if the user and interferers are time aligned we get the total received signal approximately as a sum of the user and the interferers. In other words, TOTAL=S+I, where TOTAL is the total received signal at a reception point, and S and I together constitute the time aligned node signals.

Advanced receivers, e.g. implementing turbo interference cancellation schemes, Turbo-IC, typically either work by the principle that we have already decoded or started to decode the interferer and we hence approximately know an interference contribution I and can get the wanted signal S from TOTAL−I=S+I−I=S.

The receiver can also use the statistical properties of the interference contribution I such as done in MMSE, IRC, and MRC receivers. We can also use, for example, a maximum likelihood estimate of the wanted signal S, and further also estimate the uncertainty of this guess from the statistical properties of the interference contribution I.

If on the other hand we use non-time aligned reception, knowing the received signals does not directly translate into knowing their contribution to the total signal used for the user, as illustrated in FIG. 2b.

Figure 3:
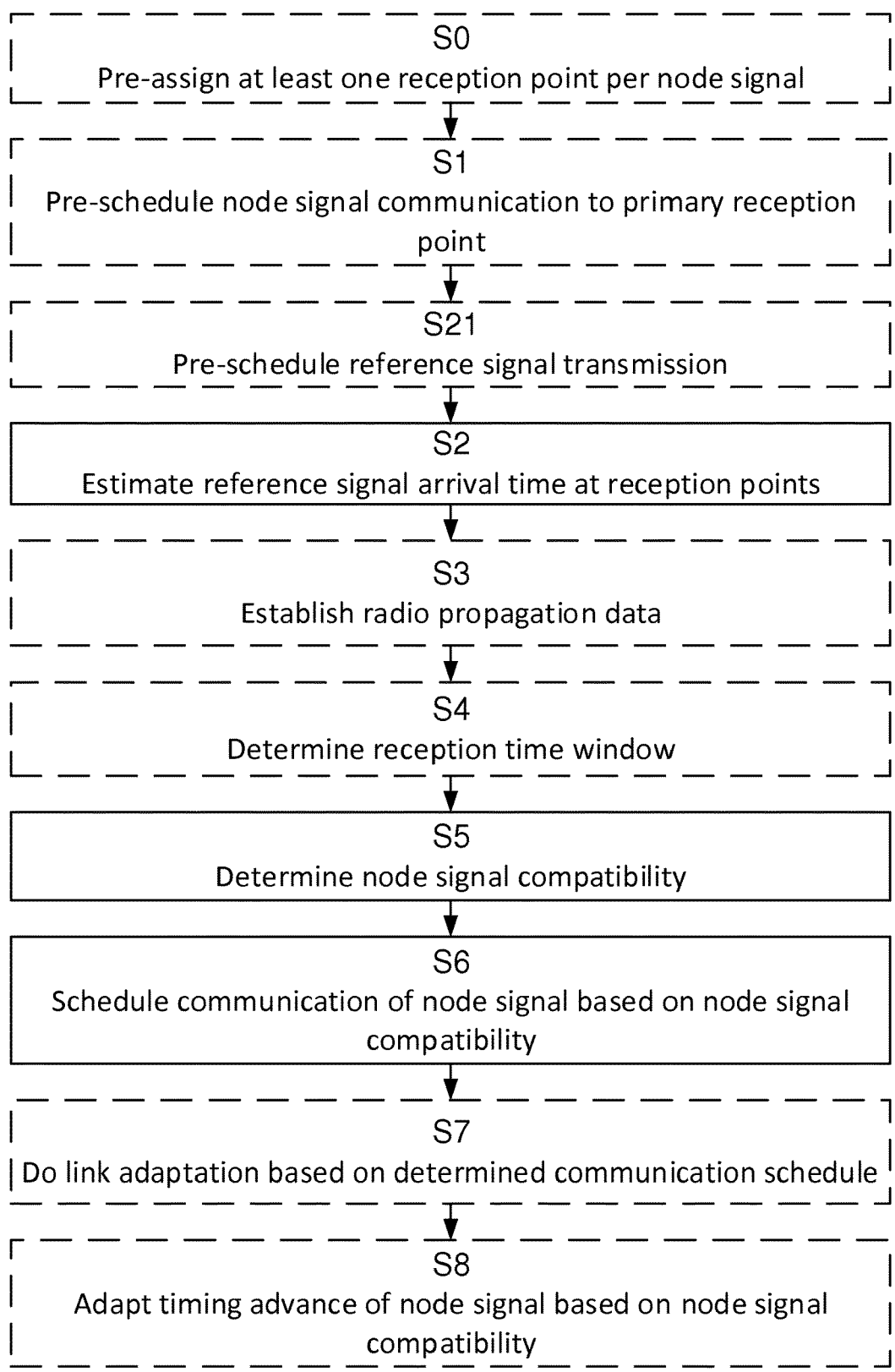
FIG. 3 is a flowchart illustrating embodiments of method steps.

FIG. 3 is a flowchart illustrating embodiments of method steps. In particular, FIG. 3 shows a method, performed in a network control entity 130, for scheduling communication of node signals from at least one network node 120a, 120b to one or more reception points 110a, 110b. Thus, at times, constructing a schedule for communication of a node signal or for communication of a plurality of node signals, can be challenging due to different propagation delays to the potentially physically separated reception points 110a, 110b.

To put the present teaching in an example context, suppose, for instance, that there is a plurality of network nodes wanting to transmit node signals to one or more reception points in a radio network. In order for these node signals to be received at the one or more reception points in good order, i.e., without excessive interference, a scheduling of communication of the node signals is done.

The method comprises the step of estimating S2, based on pre-scheduled transmission of reference signals from network nodes 120a, 120b, the arrival time of each reference signal detected at a reception point 110a, 110b.

Estimating an arrival time based on a pre-scheduled transmission of a reference signal can according to an example be done by correlating a received signal at a reception point against a known reference signal corresponding to the reference signal pre-scheduled for transmission from a network node. A peak in the correlation function is then observed at the arrival time of the reference signal.

The method also comprises the step of determining S5 compatibility between node signals received in the one or more reception points based on the estimated arrival times, wherein node signals are deemed compatible at a given reception point if the node signals can be received in one and the same transmission time interval, TTI, at the given reception point.

Detailed examples of the determining of node signal compatibility will be given below. However, it is understood that only network nodes which have similar propagation delays to a given reception point can possibly be found compatible at that reception point. Thus, the step of determining S5 node signal compatibility effectively comprises searching for groups of networks nodes which are located physically in the network such that relative propagation delays and possibly also propagation channel effects are similar, allowing the node signals transmitted from the network nodes to be received during the same TTI with an acceptable level of inter-carrier interference.

The method illustrated in FIG. 3 further comprises the step of scheduling S6 communication, comprising scheduling S61 of reception times, of at least one node signal based on determined node signal compatibility to construct a communication schedule where only compatible node signals are scheduled in the same TTI in each reception point 110a, 110b.

Hence, as noted above, groups of compatible network nodes, or individual network nodes not compatible with any other network nodes, are co-scheduled for communication such that only an acceptable level of degradation occurs. Examples of how such scheduling can be performed in practice will be given below.

Since the step of scheduling S6 communication comprises scheduling S61 reception times for the at least one node signal at one or more reception points based on determined node signal compatibility, the reception timing, e.g., the start of an FFT window or other reception window, is arranged to be set or otherwise determined based on node signal compatibility. This can be done regardless of whether any control or joint scheduling of transmission times is done in the network.

Thus, improvements in network control are provided, and in particular improvements in controlling the scheduling of node signals. By the steps of determining node signal compatibility and scheduling communication of at least one node signal based on this determined node signal compatibility there is provided a method for time alignment of node signals which overcomes the problem of having multiple reception points for receiving node signals in that only network nodes which are possible to align sufficiently well in time are scheduled for transmission and/or reception at the same time.

Further, since co-scheduled node signals can, by the determined communication schedule, be received in the same TTI, a single reception window, according to aspects consisting of a single FFT window, can be used for receiving the node signals, which is advantageous in that it reduces complexity of the receiver system.

Herein, the network control entity 130 is, according to one aspect, a scheduling unit comprised in a radio base station or eNodeB of the radio network 100. According to another aspect the network control entity 130 is a central network scheduling unit configured to determine a global communication schedule for at least part of the radio network 100. The network control unit 130 is further, according to an aspect, arranged to transmit control messages to the network nodes, which control messages comprises scheduling information, e.g., UL grants in an LTE network.

Also, said scheduling of communication, according to aspects, comprises scheduling in time, in frequency, or in both time and frequency.

According to one aspect, the method further comprises the step of pre-scheduling S21 transmission of reference signals from each of the one or more network nodes 120a, 120b. Also, the step of estimating S2 arrival time comprises estimating the arrival time of reference signals by correlating a received signal against the transmitted reference signals. This pre-scheduling of reference signal transmissions can either be done according to a pre-determined schedule, or it can be done on-demand. In the case said pre-scheduling is done on-demand, the reference signals are only scheduled for transmission when needed, i.e., when there is determined a need for constructing a new schedule, or when there is a need for updating an existing schedule. This brings an additional advantage in that the network signaling overhead due to reference signal transmission can be reduced or even minimized in the network 100.

Figure 4:
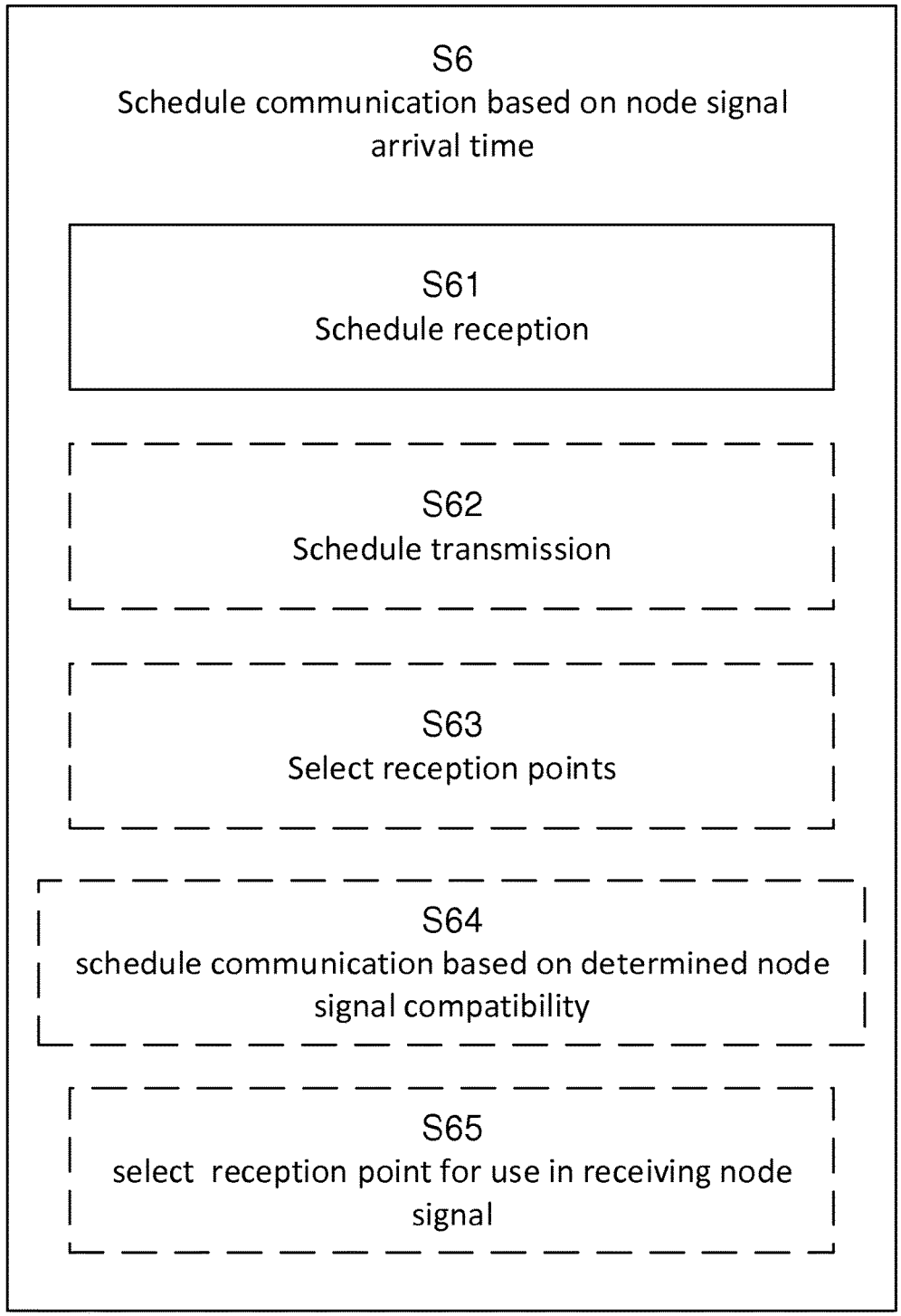
FIG. 4 illustrates aspects of a method step of the disclosure.

Turning now to FIG. 4, where aspects of the step of scheduling S6 are shown.

According to one aspect, the step of scheduling S6 comprises scheduling S62 transmission times for the at least one node signal based on determined node signal compatibility. Again, this scheduling of transmission times for the at least one node signal can be done regardless of whether any control of reception timing is being done in the network. However, scheduling of transmission times and reception times can also be done jointly in order to optimize communication schedules, which optimization according to an aspect comprises maximizing the number of compatible node signals in one or more reception points. The scheduling of transmission times, according to aspects, involves using timing advance mechanisms. Thus, the disclosed method according to aspects comprises the step of adapting S8 a timing advance parameter of at least one network node 120a, 120b based on evaluated node signal compatibility.

Thus, there is further provided a method for control of the transmission timing of node signals, which method enables control of transmission times in a network to be set such that compatible node signals arrive at a reception point sufficiently close in time to enable reception using a common FFT window, which is an advantage. Also, by the present technique, inter-carrier interference can be reduced or even minimized at a reception point since node signals which are not possible to time align by timing advance and cyclic prefixes at one or more reception points can be scheduled in different time slots.

Consequently, further improvements in the control of timing advance parameters is provided herein, since, by adapting timing based on node signal compatibility a timing advance setting which improves on, or even maximizes, node signal compatibility, locally or globally, can be determined.

According to yet another aspect, the step of scheduling S6 further comprises selecting S63 at least one reception point for receiving the at least one node signal based on determined node signal compatibility. As mentioned above, there may be scenarios where a reception point is not suitable for receiving a given node signal. Exemplary causes include the reception point being fully loaded by receiving other node signals, or the node signal being too weak in order to be received given the amount of interference resulting from a determined scheduling.

Hence, there is provided a mechanism for selecting suitable reception points for use in receiving a given node signal based on node signal compatibility, and also for avoiding use of node signals which have been received during unfavourable conditions, i.e., received in strong inter-carrier interference, which is an advantage.

Turning once more to FIG. 3, the method, according to an aspect, also comprises the step of performing link adaptation S7 based on the determined communication schedule.

This is an advantage since effects due to different scheduling of node signals, i.e., varying amounts of interference, can be compensated for by link adaptation. Further, by performing link adaptation based on the determined communication schedule, link adaptation and communication schedule can be co-optimized for increased performance, which is an advantage.

Thus, by using the present method, a network control entity 130 can for a given choice of co-scheduled network nodes and possibly also for a given choice of reception time window compensate for any performance degradation due to interference from the co-scheduling by performing link adaptation. Further, knowing which reception points will be used and an estimated signal to interference and noise ratio, SINR, for each node signal in these reception points, a combined SINR, e.g., a co-operative multi-point, CoMP, SINR can be calculated or otherwise determined. Based on this CoMP SINR the modulation and coding scheme, MCS, for each node signal can be adapted in order to, e.g., maintain a pre-determined target block error rate, BLER.

According to another aspect, the method shown in FIG. 3 also comprises the step of determining S4 a reception time window, based on determined reference signal arrival time, for reception of each node signal at each of the one or more reception points 110a, 110b. Also, the step of determining S5 node signal compatibility is further based on the at least one determined reception time window.

According to an aspect the reception time window constitutes an FFT window used in a receiver for receiving OFDM symbols.

An example method for such FFT window determination uses correlation in time with the known reference sequence transmitted by the network node in question, as mentioned above. This correlation results in a number of correlation peaks along a time axis. From these peaks, an estimate of where the FFT window can be placed so that all correlation peaks sufficiently above the noise floor is captured within the time duration dictated by the cyclic prefix duration. I.e., time samples for which the correlation c(t) is above some threshold T(N) depending on the estimated noise power N, i.e. c(t)>T(N), where T is increasing with its argument, i.e., the value of N. Observe that for some channel estimators the correlation threshold depends also on how far from the highest peak at time sample T the samples are located, i.e. T(N, t−T) is increasing in t for t−T>0 and decreasing in t for t−T<0. This implies that the example method gives a time t0 for the start of the impulse response, i.e., the first time sample with a sufficiently high correlation peak, and the estimated length d, i.e., the time sample t1=t0+d is the last time sample with a sufficiently high correlation peak.

Thus, according to an aspect, the reception time window is delimited by a start time and a stop time.

This FFT window, as discussed herein, forms the basis for scheduling network nodes, or UEs, and the FFT windows for other scheduled network nodes are considered when selecting the reception points for joint reception of the UE node signal.

Figure 5A:
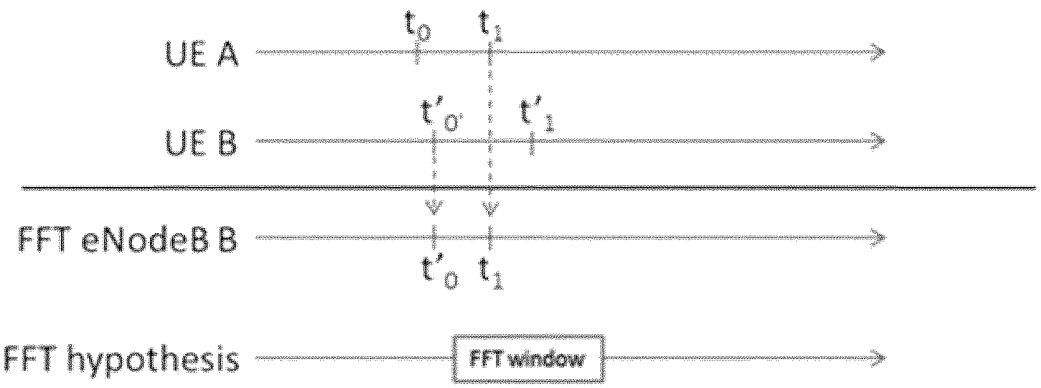
FIGS. 5a and 5b schematically illustrate aspects of determining a reception time window at a reception point.
Figure 5B:
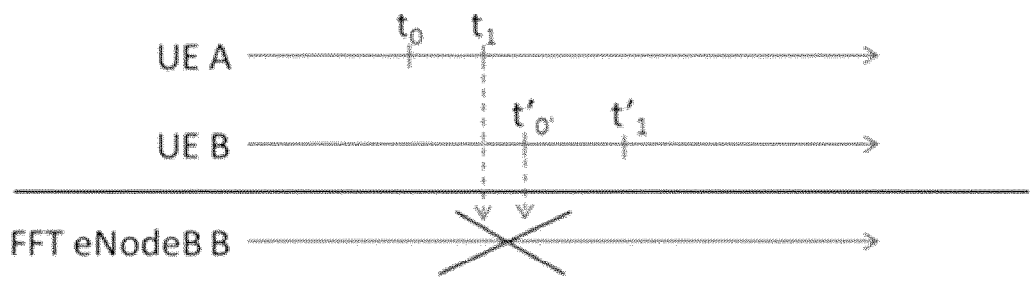

The reception time window discussed herein is exemplified in FIGS. 5a and 5b. Here, two node signals shown as UE A and UE B have been associated with reception time windows stating at $t_0$ and $t_0'$, respectively, and ending at $t_1$ and $t_1'$, respectively. Consequently, when receiving the node signal UE A, assuming it comprises an OFDM symbol, it is suitable but not necessary to use an FFT window with start time somewhere between $t_0$ and $t_1$. Also, when receiving the node signal UE B, assuming it also comprises an OFDM symbol, it is preferred to use an FFT window with start time somewhere between $t_0'$ and $t_1'$. Thus, according to an aspect, the determined reception time window indicates feasible starting time instants of an FFT window used in receiving the at least one node signal in a TTI at the reception point 110a, 110b.

According to an aspect, the method shown in FIG. 3 also comprises the step of establishing S3 radio propagation data for at least one of the radio links 113, 114, 115, 116 between the one or more network nodes 120a, 120b and the one or more reception points 110a, 110b.

Also, the step of determining S4 reception time window further comprises determining reception time window based on established radio propagation data. The step of establishing S3 radio propagation data, according to an aspect, comprises measuring the power delay profile of the radio channel from the one or more network nodes to the one or more reception points by correlating a received signal against the transmitted reference signals.

Thus, by establishing radio propagation data, such as the delay spread of a radio propagation channel, the determined reception time window can be determined to account for the characteristics of the radio propagation channel, e.g., delay spread. Consequently, a node signal arriving after having propagated through a channel with considerable delay spread occupying most of the cyclic prefix of the node signal will be associated with a reception time window of shorter duration than a node signal arriving after having propagated via a radio channel with no significant delay spread.

The step of determining S4 reception time window, according to aspects, also comprises receiving a pre-determined reception time window corresponding to a node signal and reception point from a network node. Consequently, the determining of reception time windows is not necessarily performed at the reception point, but can be performed elsewhere in the network 100. This aspect will be further discussed in connection to FIG. 7 below.

Further, the reception time window, according to aspects, can also be pre-determined from knowledge of the locations of reception points and network nodes. Thus, knowing the propagation velocity and possibly also the propagation channel responses which can be determined by, e.g., ray tracing techniques, reception time windows can be computed or otherwise determined without relying solely on estimates of arrival time.

According to one aspect, the step of determining S5 node signal compatibility further comprises determining whether the reception time window for reception of a node signal in a reception point overlaps in time with a reception time window corresponding to at least one other node signal in the same reception point.

Examples of this are shown in FIG. 5a and also in FIG. 5b. It is seen in FIG. 5a that the reception time windows of UE A and UE B overlap in time. Consequently, a valid starting time for the FFT window is anywhere between $t_0'$ and $t_1$. However, in FIG. 5b there is no overlap in time of the two reception windows. Hence, in FIG. 5b, network nodes UE A and UE B are not compatible in this reception point. It is noted that UE A and UE B can be made compatible, e.g., by adjusting time advance parameters. However, such an adjustment may well mean resulting incompatibility in some other reception point in the radio network.

Figure 8:
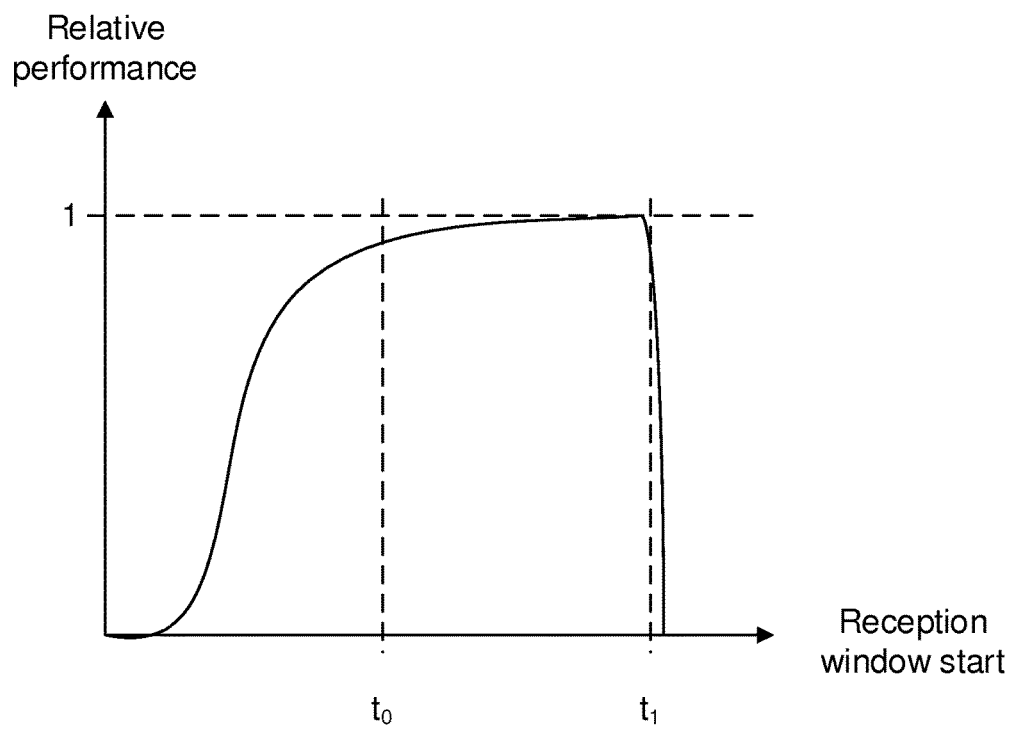
FIG. 8 schematically illustrates relative reception performance as function of reception window start.

According to another aspect, the reception time window is defined by means of a mapping or function between reception time and reception performance. Also, according to aspects, the step of determining S5 node signal compatibility further comprises determining whether a joint reception time exits such that the reception performance of each node signal corresponding to said joint reception time exceeds a pre-determined performance threshold. These variants will be further discussed and exemplified below in connection to FIG. 8.

In order to better exemplify the present teaching, some examples of method embodiments will now be given with reference to FIGS. 3 and 5.

Thus, according to one such example embodiment, the method further comprises the introductory step of pre-scheduling S1 communication of each of the least one node signals from the at least one network node 120a, 120b to a respective primary reception point of the network node. Then, the step of determining S5 node signal compatibility further comprises evaluating compatibility of the determined reception time window with respect to at least one pre-scheduled node signal reception in the at least one reception point, and the step of scheduling S6 communication of the at least one node signal comprises selecting S65 whether to use a reception point for receiving a node signal based on node signal compatibility with pre-scheduled communication at the reception point.

According to another such example embodiment, the present method is applied for scheduling communication of a plurality of node signals from a plurality of network nodes to a plurality of reception points of a radio network. Then, the step of determining S4 reception time window comprising determining a respective reception time window for reception of each of the plurality of node signals in each of the plurality of reception points based on radio propagation data and arrival time for the corresponding the radio link 113, 114, 115, 116. Also, then, the step of evaluating S5 node signal compatibility further comprises evaluating node signal compatibility for all subsets of node signals in each of the plurality of reception points, and the step of scheduling S6 communication further comprises determining a global communication schedule for transmission and reception of the plurality of node signals from the plurality of network nodes to the plurality of reception points based on the evaluated node signal compatibility.

According to yet another such exemplary embodiment, the method further comprises the introductory step of pre-assigning S0 at least one reception point for each of the one or more node signals, and the step of establishing S3 radio propagation data comprises receiving radio propagation data for each of the radio links between each of the at least one network node to the pre-assigned reception points of the network node. Also, the step of determining S4 reception time window comprises determining reception time window corresponding to each of the at least one network node in the corresponding pre-assigned reception points of the network node, and the step of determining S5 node signal compatibility further comprises constructing sets of globally compatible network nodes, which sets of globally compatible network nodes all have compatible reception time windows in each of the corresponding pre-assigned reception points. Further, the step of scheduling S6 communication further comprises scheduling communication of groups of globally compatible network nodes.

Figure 6:
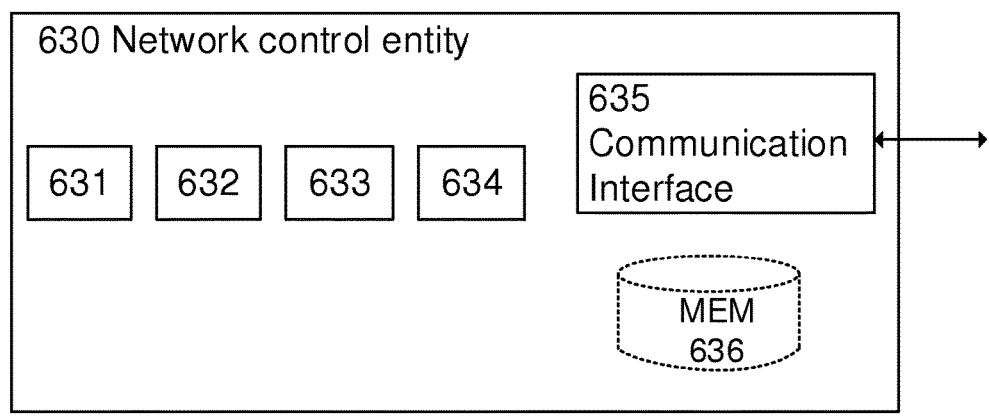
FIG. 6 is a block diagram schematically illustrating a network control entity for performing method steps.

FIG. 6 is a block diagram schematically illustrating a network control entity 630 for performing method steps of the present teaching. In particular, there is shown a network control entity 630 configured for scheduling communication of node signals from at least one network node 120a, 120b to one or more reception points 110a, 110b. The network control entity 630 comprises an estimating module 631 configured to estimate the arrival time of reference signals detected at a reception point 110a, 110b based on pre-scheduled transmission of reference signals from network nodes 120a, 120b. The network control entity 630 also comprises a node signal compatibility determining module 632 arranged to determine node signal compatibility in each of the one or more reception points 110a, 110b based on estimated reference signal arrival time. Here, as discussed above, node signals are deemed compatible at a given reception point if the node signals can be received in the same transmission time interval, TTI, at the given reception point. The network control entity 630 further comprises a scheduling module 633 configured to schedule communication, and in particular to schedule reception times, of at least one node signal based on determined node signal compatibility, and also to construct a communication schedule where only compatible node signals are scheduled in the same TTI in each reception point 110a, 110b.

Consequently, there is provided a network control entity 630 configured to optimize reception timing at reception points by selecting a schedule for reception in which node signals arranged to be received simultaneously are compatible. This is advantageous since by optimizing reception timing the need for use of multiple reception time windows, e.g., multiple different FFT windows, can be avoided.

The network control entity 630 further comprises a communication interface 635 arranged to transmit and to receive control messages, and a memory unit 636 arranged to store data. According to an aspect, the memory unit is further arranged to store a computer program. Thus, the present teaching further provides a computer program, comprising computer readable code which, when run on an apparatus, causes the apparatus to perform the method as discussed above.

Additionally, there is also disclosed herein a computer program, comprising computer readable code which, when run on an apparatus such as the network controller 630 shown in FIG. 6, causes the network controller 630 to perform the method disclosed herein.

Figure 7:
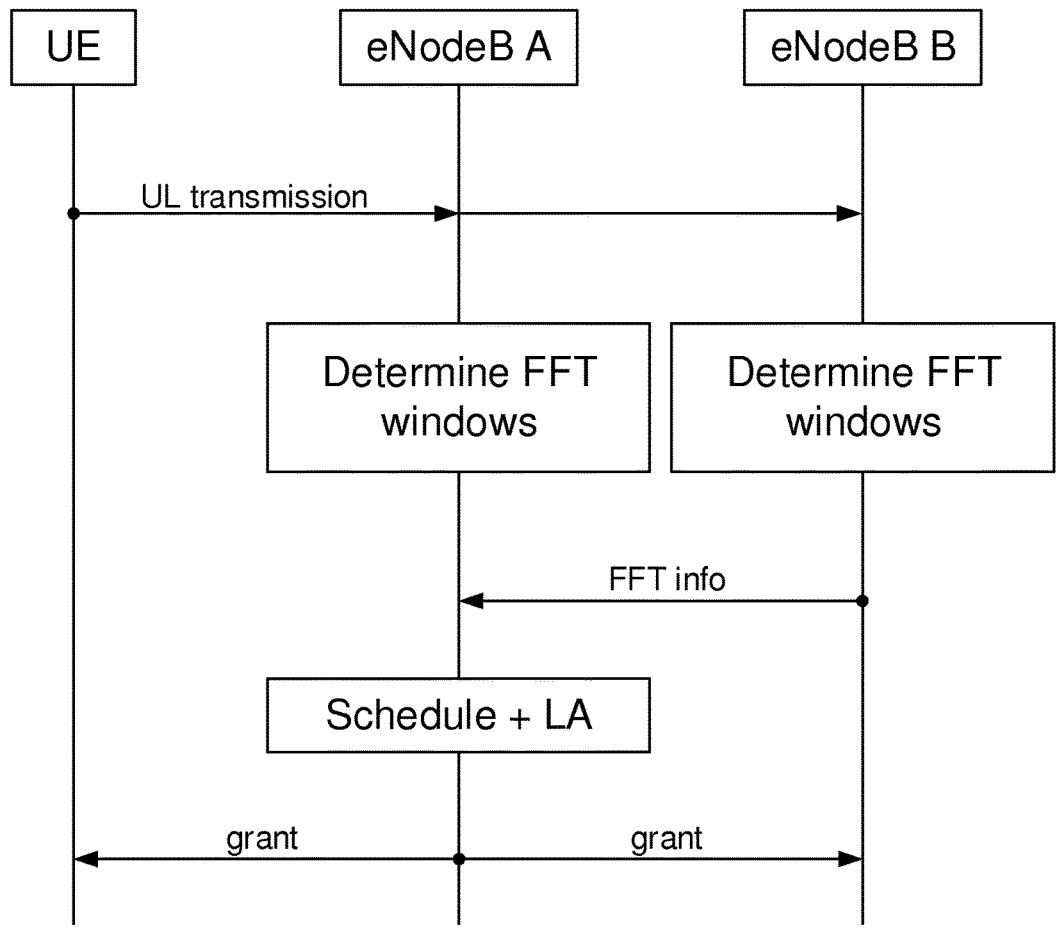
FIG. 7 is a signaling diagram illustrating an exchange of signals and processing in an embodiment of a network.

FIG. 7 shows an example operation sequence of the present teaching applied in a network 100. A network node, here shown as a UE, transmits a reference signal, here shown as an UL transmission, to reception points eNodeB A and eNodeB B. The two reception points, here part of a distributed network control entity, estimate arrival times of the UL transmission, and based on this estimated arrival time and possibly also on other information such as delay spread, determines a reception time window, here shown as FFT windows. According to this example the eNodeB B transmits its determined FFT window to the reception point eNodeB A, which proceeds to determine a schedule and also determines a suitable link adaptation, LA, to go with the determined schedule. Finally, UL grants are distributed according to the determined schedule.

As explained above a non-optimal choice of Reception time window can result in severe performance loss. This implies that only joint Reception time windows that are estimated to not result in any significant performance loss are relevant for consideration in constructing the schedule.

Hence, according to some aspects, the Reception time window for a reception point i and network node j is defined as an interval of time when the Reception time window can start, i.e., FFT_WINDOW_START(i,j)=$[t_0\ t_1]$.

According to another aspect, the Reception time window is defined as a performance estimate for different choices of Reception time windows. This is further exemplified in FIG. 8, where there has been determined a relative performance measure, e.g., in terms of signal to interference and noise ratio, SINR, as function of the starting time instant of a reception time window.

For example, the beginning of the Reception time window is placed by estimating the start $t_0$ or arrival time of a node signal and the length of the impulse response of the radio propagation channel is d. Then if the cyclic prefix length is cp the end of the reception time window can be determined as $t_1=t_0+cp-d$.

For joint scheduling of multiple network nodes the joint Reception time window is also implicitly always needed. According to one example the scheduling takes the joint Reception time windows into account explicitly in the scheduling before the transmission. Assuming that reception windows are available for each node signal at each reception point in the network, we have FFT_WINDOW_START(i,j)=$[t_0\ t_1]$. For a set of network nodes U, the FFT_WINDOW_START(U,j) for eNodeB j is then, according to an aspect, FFT_WINDOW_START(U,j)=$\cap_{j\ in\ U}$ FFT_WINDOW_START (i, j).

In a radio network each reception point j then is assigned an Reception time window for each choice of scheduled network nodes U, denote this value for the timing window $W_j(U)$, which correspond to a choice of FFT sampling interval for uplink reception. Each such choice is associated with a performance penalty $P_j(i,U)$ for each network nodes i. Observe that for some choices of U, $P_j(i,U)$ can be very small or even approaching zero. Hence one quite useful example how $P_j(i,U)$ could be defined is to define it as the relative SINR in the reception point for the given Reception time window placement and network nodes. This is suitable since most existing schedulers use an estimated SINR for all used reception points to determine how valuable it is to schedule a network nodes i at some resource block R.

The estimated SINR is then transformed to a number of bits, for example, using estimates of Shannon capacity. The number of bits is then transformed to a value by a policy determined by the operator, for example, using the proportional fair metric. Then the set of network nodes that gives the highest metric is scheduled. Hence by defining $P_j(i,U)$ in this way many existing mechanisms in an existing scheduler can be reused by just changing the SINR estimate.

One way of putting the present teaching to use is by defining $P_j(i,U)$ as above, that is $P_j(i,U)=1$ if we can place a Reception time window, and 0 if we cannot place a joint Reception time window. This definition captures one big benefit of the invention, that is when we cannot use a correct Reception time window we can avoid sending useless data over the sometimes congested backhaul, which we would often do when we are not aware which reception points that can use an working Reception time window for a particular network nodes.

Using the described method, each scheduler in a network 100 can for each choice of network nodes U pick a scheduling of the Reception time window $W_j(U)$ and take this into consideration in the scheduling by for each scheduled network nodes compensate the performance, for example, measured by the SINR, by the performance compensation factor compared to an estimated optimal reception window performance. Using these performance values, the scheduler can pick which network nodes should be scheduled and which reception points that said network nodes should be received in.

Aspects of the disclosure are described with reference to the drawings, e.g., block diagrams and/or flowcharts. It is understood that several entities in the drawings, e.g., blocks of the block diagrams, and also combinations of entities in the drawings, can be implemented by computer program instructions, which instructions can be stored in a computer-readable memory, and also loaded onto a computer or other programmable data processing apparatus. Such computer program instructions can be provided to a processor of a general purpose computer, a special purpose computer and/or other programmable data processing apparatus to produce a machine, such that the instructions, which execute via the processor of the computer and/or other programmable data processing apparatus, create means for implementing the functions/acts specified in the block diagrams and/or flowchart block or blocks.

In some implementations and according to some aspects of the disclosure, the functions or steps noted in the blocks can occur out of the order noted in the operational illustrations. For example, two blocks shown in succession can in fact be executed substantially concurrently or the blocks can sometimes be executed in the reverse order, depending upon the functionality/acts involved. Also, the functions or steps noted in the blocks can according to some aspects of the disclosure be executed continuously in a loop.

In the drawings and specification, there have been disclosed exemplary aspects of the disclosure. However, many variations and modifications can be made to these aspects without substantially departing from the principles of the present disclosure. Thus, the disclosure should be regarded as illustrative rather than restrictive, and not as being limited to the particular aspects discussed above. Accordingly, although specific terms are employed, they are used in a generic and descriptive sense only and not for purposes of limitation.

The invention claimed is:

1. A method, performed in a network control entity, for scheduling communication of node signals from at least one network node to one or more reception points, the method comprising the steps of:
    estimating, based on pre-scheduled transmissions of reference signals from network nodes, an arrival time of each reference signal detected at a reception point;
    determining compatibility between node signals received in the one or more reception points based on the estimated arrival times, wherein a first node signal and a second node signal are deemed compatible at a given reception point if the first and second node signals can be received in one and the same transmission time interval, TTI, at the given reception point and each of the first and second node signals have a similar propagation delay; and
    scheduling communication, comprising scheduling of reception times at the one or more reception points, of at least one node signal based on the determined node signal compatibility thereby enabling construction of a communication schedule where only compatible node signals are scheduled in the same TTI in each reception point, wherein the step of scheduling further comprises selecting at least one reception point for receiving the at least one node signal based on the determined node signal compatibility.

2. The method of claim 1, further comprising the step of pre-scheduling transmission of reference signals from each of the one or more network nodes, and wherein the step of estimating arrival time comprises estimating the arrival time of reference signals by correlating a received signal against the transmitted reference signals.

3. The method of claim 1, wherein the step of scheduling comprises scheduling transmission times for the at least one node signal based on determined node signal compatibility.

4. The method of claim 1, further comprising the step of performing link adaptation based on the determined communication schedule.

5. The method of claim 1, further comprising the step of determining a reception time window, based on determined reference signal arrival time, for reception of each node signal at each of the one or more reception points, and wherein the step of determining node signal compatibility is further based on the at least one determined reception time window.

6. The method of claim 5, further comprising the step of establishing radio propagation data for at least one of the radio links between the one or more network nodes and the one or more reception points, and wherein the step of determining reception time window further comprising determining reception time window based on established radio propagation data.

7. The method of claim 5, wherein the step of determining node signal compatibility further comprises determining whether the reception time window for reception of a node signal in a reception point overlaps in time with a reception time window corresponding to at least one other node signal in the same reception point.

8. The method of claim 5, wherein the reception time window is defined based on a mapping or function between reception time and reception performance.

9. The method of claim 8, wherein the step of determining node signal compatibility comprises determining whether a joint reception time exists such that the reception performance of each node signal corresponding to said joint reception time exceeds a pre-determined performance threshold.

10. The method of claim 5, further comprising the step of adapting a timing advance parameter of at least one network node based on evaluated node signal compatibility.

11. The method of claim 1, wherein the network control entity is a scheduling unit comprised in a radio base station of the radio network.

12. The method of claim 1, wherein the network control entity is a central network scheduling unit configured to determine a global communication schedule for at least part of the radio network.

13. A computer program, comprising computer readable code which, when run on an apparatus, causes the apparatus to perform the method of claim 1.

14. A network control entity configured for scheduling communication of node signals from at least one network node to one or more reception points, the network control entity comprising:
    a communication interface arranged to transmit and to receive control messages;
    memory configured to store data; and
    a processor coupled to the memory and the communication interface, the processor configured to:
    estimate the arrival time of reference signals detected at a reception point based on pre-scheduled transmission of reference signals from network nodes,
    determine node signal compatibility in each of the one or more reception points based on estimated reference signal arrival time, wherein a first node signal and a second node signal are deemed compatible at a given reception point if the first and second node signals can be received in the same transmission time interval, TTI, at the given reception point and each of the first and second node signals have a similar propagation delay, and schedule reception times, of at least one node signal based on determined node signal compatibility, and also to construct a communication schedule where only compatible node signals are scheduled in the same TTI in each reception point, wherein the step of scheduling further comprises selecting at least one reception point for receiving the at least one node signal based on the determined node signal compatibility.

\* \* \* \* \*